US006583715B1

(12) United States Patent
Benzie et al.

(10) Patent No.: US 6,583,715 B1
(45) Date of Patent: Jun. 24, 2003

(54) METHOD AND SYSTEM FOR UNLOCKING AND/OR OPENING AT LEAST ONE OPENABLE MEMBER OF A MOTOR VEHICLE

(75) Inventors: Thomas P. Benzie, Ann Arbor, MI (US); John P. Hill, Hazel Park, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/514,728

(22) Filed: Feb. 28, 2000

(51) Int. Cl.[7] .................................................. G06F 7/04

(52) U.S. Cl. ..................... 340/5.64; 340/5.62; 340/5.72

(58) Field of Search ............................... 340/5.64, 5.61, 340/5.62, 5.63, 5.72, 10.1, 426, 825.69, 825.72; 341/176; 318/468; 180/287

(56) References Cited

U.S. PATENT DOCUMENTS

| | | | | |
|---|---|---|---|---|
| 4,688,036 A | * | 8/1987 | Hirano et al. | 340/5.62 |
| 5,515,036 A | | 5/1996 | Waraksa et al. | |
| 5,929,769 A | | 7/1999 | Garnault | |
| 5,933,082 A | | 8/1999 | Abita et al. | |
| 5,973,611 A | * | 10/1999 | Kulha et al. | 340/5.62 |
| 5,982,126 A | * | 11/1999 | Hellinga et al. | 318/468 |
| 6,034,617 A | * | 3/2000 | Luebke et al. | 340/5.62 |
| 6,075,460 A | * | 6/2000 | Minissale et al. | 340/825.69 |

* cited by examiner

*Primary Examiner*—Edwin C. Holloway, III
(74) *Attorney, Agent, or Firm*—Bill C. Panagos

(57) ABSTRACT

A method and a keyless entry system are provided for unlocking and/or opening at least one openable member such as a door of a motor vehicle. A key fob transmitter unit including a single manually operable switch or push-button is capable of transmitting a coded signal to unlock and/or open at least one door of the motor vehicle. A receiver module is responsive to the coded signal for providing a receiver signal in response to the coded signal. A plurality of sensors are positioned at different doors for sensing an approach of one or more users of the vehicle or objects carried by the users in the immediate vicinity of the doors and to provide corresponding proximity signals in response thereto. A controller processes the receiver and proximity signals to obtain control signals to unlock and/or open the doors.

13 Claims, 2 Drawing Sheets

METHOD AND SYSTEM FOR UNLOCKING AND/OR OPENING AT LEAST ONE OPENABLE MEMBER OF A MOTOR VEHICLE

TECHNICAL FIELD

The invention relates to methods and systems for unlocking and/or opening at least one openable member such as a door of a motor vehicle.

BACKGROUND ART

An automotive vehicle with automated sliding doors on opposite sides of the vehicle typically must have two buttons on a key fob transmitter to control each sliding door independently. This makes such a fob as well as the rest of the keyless entry system more costly and complex.

The to Garnault, U.S. Pat. No. 5,929,769, discloses a hands-free system for unlocking and/or opening a trunk and/or door of a motor vehicle. The system includes a transmitter/receiver and a transponder which communicate with one another only when the transponder is located in the immediate vicinity of an antenna of the system to unlock and/or open its door.

The to Waraksa, U.S. Pat. No. 5,515,036, discloses a passive keyless entry system to unlock a vehicle as the operator approaches the vehicle. The system includes a portable beacon that is carried by the operator and a receiver/controller located in the vehicle.

The to Abita et al., U.S. Pat. No. 5,933,082, discloses a passive alarm system for visually impaired individuals.

DISCLOSURE OF INVENTION

An object of the present invention is to provide a method and system for unlocking and/or opening at least one openable member of a motor vehicle using a passive ability of the system to detect which door of the vehicle to open.

Another object of the present invention is to provide a method and system for unlocking and/or opening at least one openable member of a motor vehicle wherein only a single manually operable switch or button need be provided on a key fob transmitter unit to control each door of the vehicle independently.

In carrying out the above objects and other objects of the present invention, a method is provided for unlocking and/or opening at least one openable member of a motor vehicle. The method includes receiving a coded signal to unlock or open at least one openable member of the motor vehicle, sensing an approach of a user of the vehicle or object carried by the user in the immediate vicinity of the at least one openable member to obtain a proximity signal, and processing the proximity signal and the received coded signal to obtain a control signal to unlock and/or open the at least one openable member.

Preferably, the at least one openable member is an automated sliding door.

Further in carrying out the above objects and other objects of the present invention, a keyless entry system for unlocking and/or opening at least one openable member of a motor vehicle is provided. The system includes a key fob transmitter unit including a single manually operable switch capable of transmitting a coded signal to unlock and/or open at least one openable member of the motor vehicle. The system further includes a receiver module responsive to the coded signal for providing a receiver signal in response to the coded signal and a plurality of sensors. Each of the sensors is positioned at a different openable member of the vehicle for sensing an approach of a user of the vehicle or an object carried by the user in the immediate vicinity of its openable member and to provide a corresponding proximity signal in response thereto. The system also includes a controller for processing the receiver and proximity signals to obtain a control signal to unlock and/or open the at least one openable member.

The sensors are typically passive sensors and may be Doppler radar sensors for sensing movement of a user adjacent their respective openable members.

Each of the sensors may be an interrogator for interrogating at least one transponder carried by the user located in its immediate vicinity.

The sensors may also be photosensors.

The manually-openable switch is typically a pushbutton switch.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
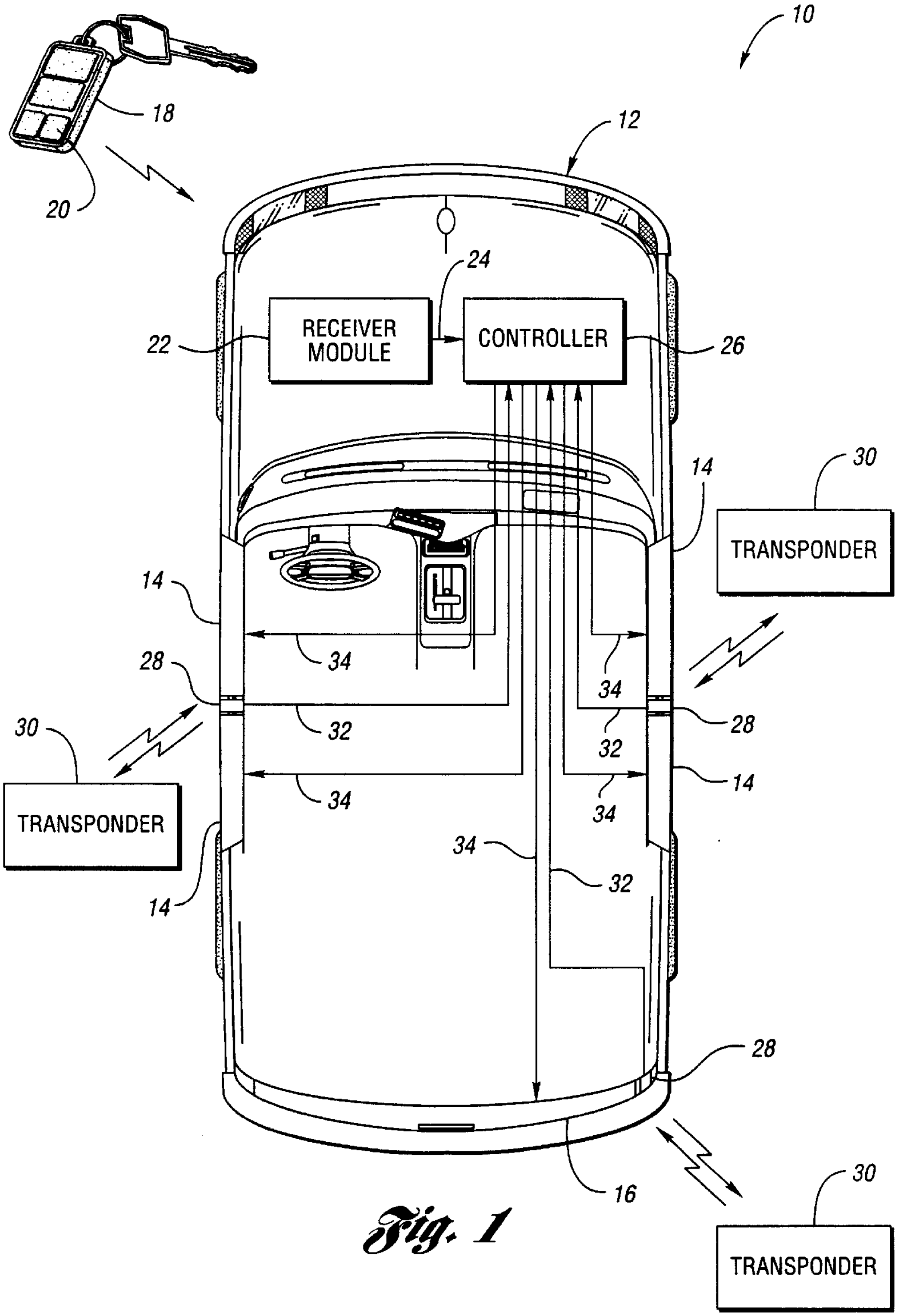
FIG. 1 is a top schematic view of a motor vehicle and the system of the present invention.

Referring now to FIG. 1, there is illustrated a keyless entry system, generally indicated at 10, for unlocking and/or opening one or more openable member of a motor vehicle, generally indicated at 12. The openable members are preferably side doors 14 of the motor vehicle 12 such as automated sliding doors. The system 10 may also open and/or unlock a rear door 16 of the vehicle 12.

The system 10 typically includes a key fob transmitter unit 18 including a single manually operable switch or button 20 capable of transmitting a coded signal to unlock and/or open at least one door 14 or 16 of the motor vehicle 12.

The system 10 also includes a receiver module 22 responsive to the coded signal for providing a receiver signal along line 24 in response to the coded signal to a controller 26.

Still further, the system 10 includes a plurality of sensors 28. Each of the sensors 28 is positioned at a different door 14 or 16 of the vehicle 12 for sensing an approach of a user of the vehicle 12 or an object such as a transponder 30 carried by the user in the immediate vicinity of its door 14 or 16 and to provide a corresponding proximity signal along lines 32 in response thereto to the controller 26.

By placing a sensor 28 on either side of the vehicle 12, the system 10 can tell if anyone is approaching the vehicle 12 and from which side of the vehicle 12 they are approaching.

The controller 26 processes the receiver and proximity signals to obtain one or more control signals on lines 34 to unlock and/or open one or more doors 14 and 16.

The sensors 28 may be Doppler radar sensors for sensing movement of a user adjacent their respective doors 14 or 16. Alternatively, each of the sensors 28 may be an interrogator for interrogating the transponders 30 carried by users located in their immediate vicinity. Also, alternatively, the sensors 28 may be photosensors.

The system 10 with any of these sensors 28 could tell which side of the vehicle 12 has people approaching and open the appropriate door 14 or 16. The system 10 would operative passively without overt communication from the user as to which door or doors 14 and 16 to open. An alternative to opening a door would be to simply unlock the door or doors 14 and 16.

Figure 2:
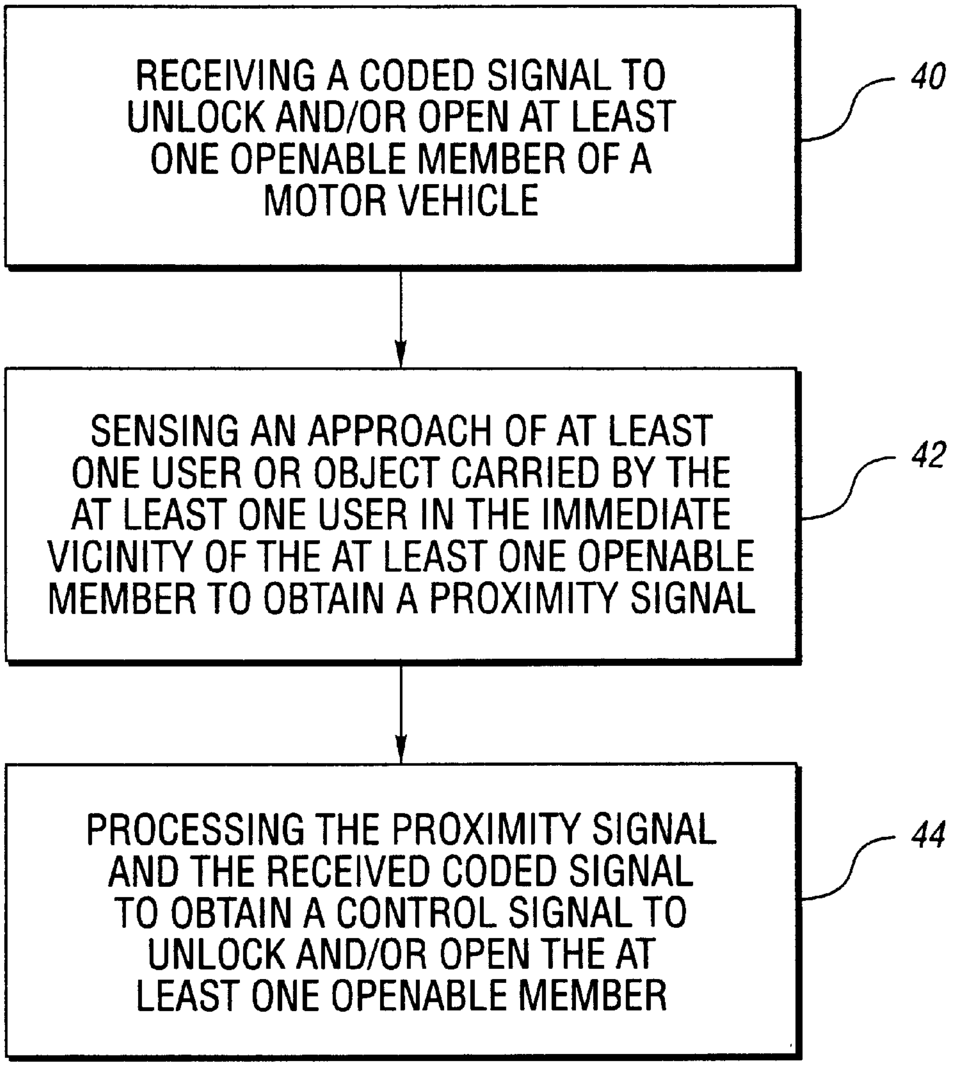
FIG. 2 is a block diagram flow chart illustrating the method of the present invention.

As illustrated in FIG. 2, to initiate an opening cycle, the user would activate the fob 18 and a signal would be transmitted to the module 22 on the vehicle 12. The module 22 would receive the signal at block 40 and wait for a sensor 28 to detect something near the vehicle 12, as indicated at block 42. The controller 26 processes receiver and proximity signals on lines 24 and 32 from the module 22 and the sensors 28, respectively, to obtain one or more control signals on lines 34 as indicated at block 44 of FIG. 2.

With a Doppler Radar sensor, the system 10 would detect any movement. This system 10 has an advantage for Mom. As she is loading up the Little League team or the Scouts, multiple doors 14 and 16 would open with a single fob depression. The disadvantage of this system 10 is that occasionally an extra door would open. The system 10 would not discriminate between users of this vehicle and other movement in the area.

Radio frequency tag sensor improves the security of the system 10 and removes the possibility of unintentional operation. The vehicle 12 would open the door 14 whenever a sensor 28 detected a transponder 30 within a small radius of the sensor 28.

An optical sensor is similar in operation to the Doppler Radar sensor.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for unlocking and/or opening at least one openable member of a motor vehicle, each openable member having a corresponding proximity sensor, the method comprising:

- transmitting a coded signal using a single manually operable switch;
- receiving the coded signal to unlock and/or open the at least one openable member of the motor vehicle;
- sensing an approach of a user of the vehicle or object carried by the user in the immediate vicinity of the at least one openable member to obtain a proximity signal provided by its corresponding to the proximity sensor; and
- processing the proximity signal and the received coded signal to obtain a control signal to unlock and/or open each at least one openable member corresponding to the proximity signal, wherein the particular openable member is unlocked and/or opened only when the coded signal is received and the corresponding proximity signal is provided when the user of the vehicle or the object carried by the user is in the immediate vicinity of the at least one openable member.

2. The method as claimed in claim 1 wherein the at least one openable member is at least one door of the motor vehicle.

3. The method as claimed in claim 2 wherein the at least one door is an automated sliding door.

4. A keyless entry system for unlocking and/or opening at least one openable member of a motor vehicle, the system comprising:

- a key fob transmitter unit including a single manually operable switch capable of transmitting a coded signal to unlock and/or open at least one openable member of the motor vehicle;
- a receiver module responsive to the coded signal for providing a receiver signal in response to the coded signal;
- a plurality of sensors, each of the sensors being positioned at a different corresponding openable member of the vehicle for sensing an approach of a user of the vehicle or an object carried by the user in the immediate vicinity of its corresponding openable member and to provide a corresponding proximity signal in response thereto; and
- a controller for processing the receiver and proximity signals to obtain a control signal to unlock and/or open each at least one openable member corresponding to the proximity signal, wherein the particular openable member is unlocked and/or opened only when the coded signal is received and the corresponding proximity signal is provided when the user of the vehicle or the object carried by the user is in the immediate vicinity of the at least one openable member.

5. The system as claimed in claim 4 wherein the sensors are Doppler radar sensors for sensing movement of the user adjacent their respective openable members.

6. The system as claimed in claim 4 wherein each of the sensors is an interrogator for interrogating at least one transponder carried by the user located in its immediate vicinity.

7. The system as claimed in claim 4 wherein the sensors are photosensors.

8. The system as claimed in claim 4 wherein the manually operable switch is a pushbutton switch.

9. The system as claimed in claim 4 wherein the at least one openable member is at least one door of the motor vehicle.

10. The system as claimed in claim 9 wherein the at least one door is an automated sliding door.

11. The system as claimed in claim 4 wherein the sensors are passive sensors.

12. The method as claimed in claim 1 wherein the method comprises receiving the coded signal and waiting for sensing the approach of the user.

13. The system as claimed in claim 4 wherein the receiver module is configured to receive the coded signal and wait for the proximity signal.

* * * * *